(12) United States Patent
Pang

(10) Patent No.: US 8,645,691 B2
(45) Date of Patent: Feb. 4, 2014

(54) SYSTEM AND METHOD FOR SECURING DATA WHILE MINIMIZING BANDWIDTH

(75) Inventor: Jon L. Pang, San Diego, CA (US)

(73) Assignee: Combined Conditional Access Development And Support, LLC, San Diego, CA (US)

(*) Notice: Subject to any disclaimer, the term of this patent is extended or adjusted under 35 U.S.C. 154(b) by 30 days.

(21) Appl. No.: 13/350,415

(22) Filed: Jan. 13, 2012

(65) Prior Publication Data

US 2013/0185566 A1 Jul. 18, 2013

(51) Int. Cl.
*H04L 9/00* (2006.01)

(52) U.S. Cl.
USPC .......................... 713/168; 713/176; 713/180

(58) Field of Classification Search
USPC ......... 713/150, 155, 168–171, 176–177, 181, 713/189, 180; 726/26–33; 380/200, 201, 28
See application file for complete search history.

(56) References Cited

U.S. PATENT DOCUMENTS

| | | | |
|---|---|---|---|
| 6,526,144 B2 * | 2/2003 | Markandey et al. | 380/28 |
| 7,624,276 B2 * | 11/2009 | Princen et al. | 713/177 |
| 2011/0255690 A1 * | 10/2011 | Kocher et al. | 380/210 |

* cited by examiner

*Primary Examiner* — Hosuk Song
(74) *Attorney, Agent, or Firm* — Ballard Spahr LLP

(57) ABSTRACT

Systems and methods for securing data are disclosed. A method for securing data can comprise processing a data block to generate a signature, processing the signature to generate a reduced signature, transmitting the data block to a recipient, and transmitting the reduced signature to the recipient.

29 Claims, 6 Drawing Sheets

SYSTEM AND METHOD FOR SECURING DATA WHILE MINIMIZING BANDWIDTH

BACKGROUND

Conditional access (CA) systems typically transmit information related to a particular content program stream (e.g., MPEG) multiple times per second. In addition, the conditional access (CA) information needs to be protected in a manner to avoid the misuse of the CA information by end users. The protection of the CA information along with the frequency at which it needs to be transmitted may cause consumption of bandwidth on the network to the point of diminishing the quality and/or number of content services being provided.

Bandwidth is one of the most valuable assets in a network. At the same time, security is important to minimize theft of service. Any reduction of security related bandwidth usage must be weighed against security concerns to use minimal bandwidth with maximum security. In conventional solutions, full security signatures are attached to each message that is to be secured. Typically, longer security signatures provide greater security. Unfortunately, the longer signatures also require more bandwidth. New solutions are needed to minimize bandwidth usage without compromising security.

SUMMARY

It is to be understood that both the following summary and the following detailed description are exemplary and explanatory only and are not restrictive, as claimed. Provided are methods and systems for authenticating data while minimizing bandwidth. In an aspect, a data block (e.g., CA information, capability information, and/or other information to be authenticated) can be encrypted using a private key followed by a hash of the resulting signature. The hash of the signature generates a first reduced signature that can be used to validate the data block. The data block and the first reduced signature can be transmitted to a recipient device and/or system. On the receiving end the device and/or system can encrypt the data block with a private key (e.g., the same private key used at the transmission end) followed by a hash resulting in a second reduced signature. The first reduced signature can be compared to the second reduced signature. When the first and second reduced signatures are the same, the recipient device can validate that the data block was sent by a valid source and will process the information accordingly.

In an aspect, a method for processing data can comprise processing a data block to generate a signature, processing the signature to generate a reduced signature, transmitting the data block to a recipient, and transmitting the reduced signature to the recipient.

In an aspect, a method for processing data can comprise receiving a data block, receiving a reduced signature, processing the data block to generate a signature, processing the signature to generate a comparative element, and comparing the reduced signature to the comparative element to authenticate the data block.

In an aspect, a system can comprise a memory for storing a data block and a reduced signature, a processor in communication with the memory, the processor configured to, process the data block to generate a signature, process the signature to generate a comparative element, and compare the reduced signature to the comparative element to authenticate the data block.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
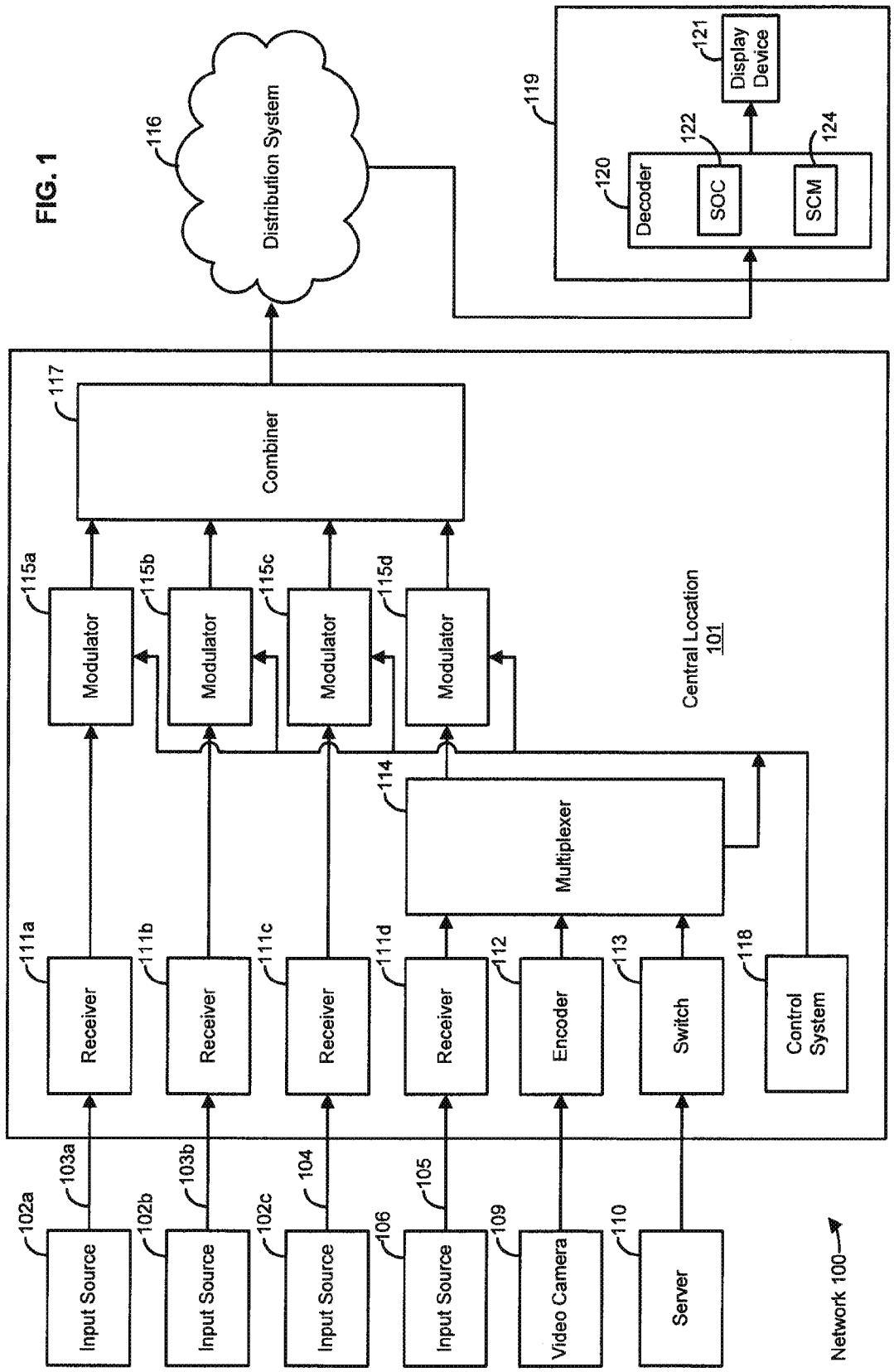
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises ," means "including but not limited to," and is not intended to exclude, for example, other components, integers or steps. "Exemplary" means "an example of " and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system can be configured to authenticate data in a content delivery environment. However, other data in various environments and domains can be authenticated using the systems and methods described herein.

FIG. 1 illustrates various aspects of an exemplary network environment in which the present methods and systems can operate. The present disclosure relates to systems and methods for authenticating data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a headend, a processing center, etc.), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g., satellite paths 103a, 103b) and terrestrial path 104. The central location 101 can also receive content from a direct feed source 106 via a direct line 105. Content may also be created at the central location 101. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be, for example, a pay-per-view server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115a, 115b, 115c, and 115d, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of the network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway, a digital transport adapter (DTA), a universal digital transport adapter ((U)DTA), or home communications terminal (HCT), that can decode, if needed, the signals for display on a display device 121, such as on a television set (TV), a mobile device, or a computer monitor. Various wireless devices may also be connected to the network at, or proximate, user location 119. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, display devices 121, central locations 101, DVR's, home theater PC's, and the like.

In an aspect, user location 119 is not fixed. By way of example, a user can receive content from the distribution system 116 on a mobile device such as a laptop computer, PDA, smart phone, GPS, vehicle entertainment system, portable media player, and the like.

In an aspect, the decoder 120 can comprise a system on a chip (SOC) 122 such as an integrated circuit that implements the requirements associated with the decoder 120. As an example, the SOC 122 can be configured to implement various signal processing and authentication procedures necessary to decode digital signals in a cable network. In an aspect, the SOC 122 can have a particular SOC type associated therewith. As an example, the SOC type can be an identifier for a particular SOC or a set of SOCs. As a further example, the SOC type can comprise a key hierarchy design and a value of a pre-defined control word protection key (CWPK). However, other identifiers can be used.

In an aspect, SOCs providing security for control word processing can be designated Class 1 SOCs. As an example, recipient devices comprising Class 1 SOCs can perform all message processing related to access rights in a code external to the SOC (e.g., executed in a SOC host processor), including authentication of the access rights and related data. However other designations for various SOCs can be used.

In an aspect, SOCs providing additional security to support features and processing beyond control word processing can be designated Class 2 SOCs. As an example, Class 2 SOCs can comprise a software module 124 that can be executed by the SOC 122. As an example, the software module 124 can be stored in a tamper-resistant memory of the SOC 122. In an aspect, the software module 124 can be responsible for authenticating authorization data, verifying an authorization status of the decoder 120, and loading encrypted control words and related data on the basis of the authorization status of the decoder 120. As an example, the software module 124 can be an authenticated secure code module (SCM). As a further example, the software module 124 can be designed for a particular SOC, SOC type, SOC classification, decoder, or the like. However, other modules and designations for various SOCs can be used.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, MPEG-4, and subsequent MPEG standards are hereinafter referred to as MPEG. In an MPEG encoded transmission, content and other data are transmitted in packets, which collectively make up a transport stream. In an exemplary aspect, the present methods and systems can employ transmission of MPEG packets. However, the present methods and systems are not so limited, and can be implemented using other types of transmission and data.

The output of a single MPEG audio and/or video coder can be a transport stream comprised of one or more elementary streams. An elementary stream is an endless near real-time signal. For convenience, the elementary stream may be broken into data blocks of manageable size, forming a packetized elementary stream (PES). These data blocks can rely on header information to identify the start of the packets and can include time stamps because packetizing disrupts the time axis. For transmission and digital broadcasting, for example, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream is more than just a multiplex of data, audio, and/or video PESs. In addition to the compressed video, audio and data, a transport stream can include metadata describing the bit stream. This includes the program association table (PAT) that lists every program in the multi program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. The receiver can discard the contents of all other PIDs.

The multi program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

In an aspect, Conditional Access information can provide a permission for the decoder 120 to access a service or particular programming subject to content protection. For example, the Conditional Access information can comprise a set of rights that allows the decoder 120 to access any service which requires possession of at least one of the rights granted by the Conditional Access information. As a further example, rights may be package rights or base rights. In an aspect, package rights can be a right representing access to a set of services. In an aspect, a base right can be a right which is not a package right. As an example, base rights can represents access to an individual service such as a special programming, a pay-per-view programming, or add-on subscription.

Figure 2:
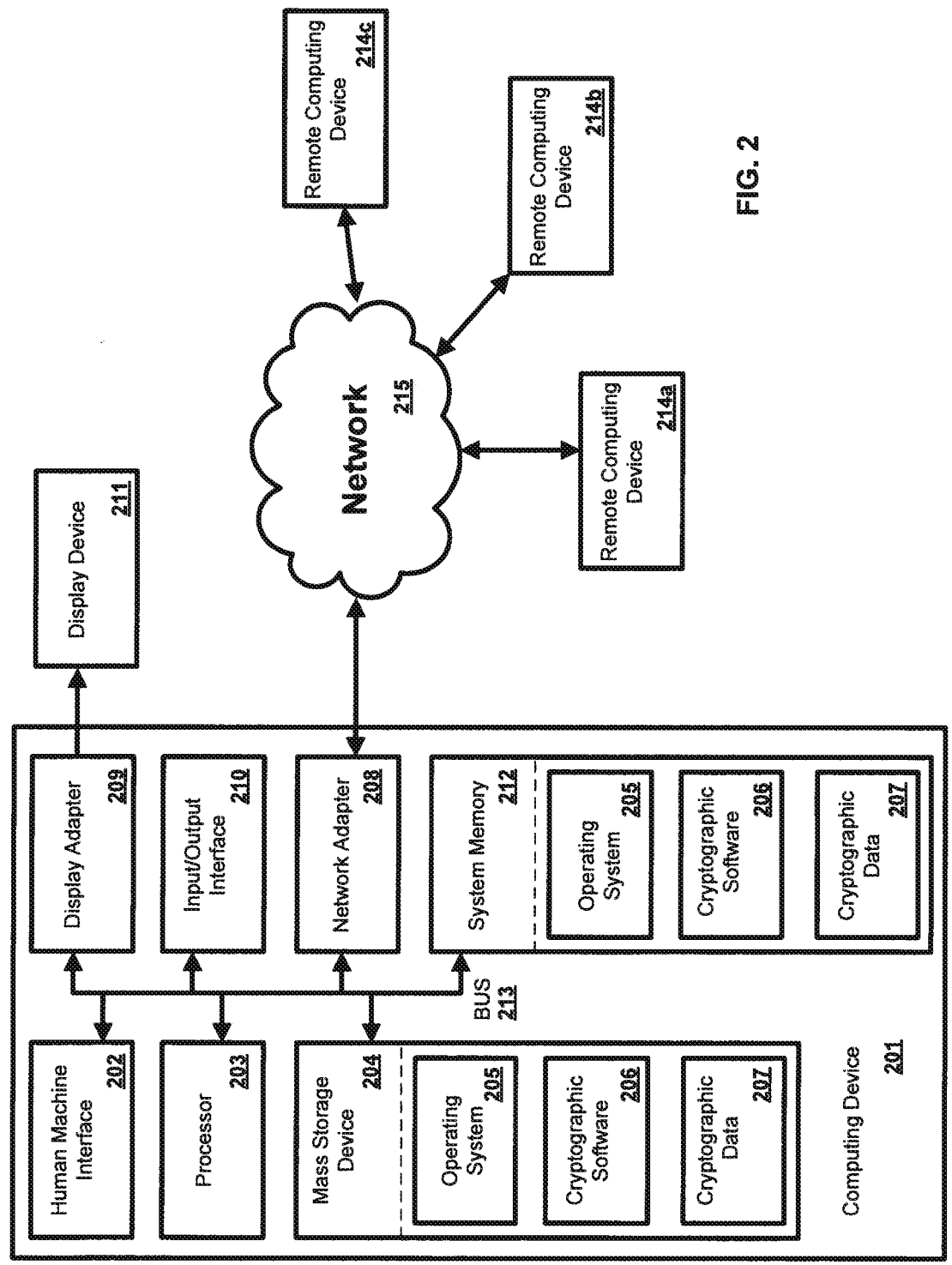
FIG. 2 is a block diagram of an exemplary computing device.

As described in greater detail below, the methods and systems can be implemented on a computing system such as computing device 201 as illustrated in FIG. 2 and described below. By way of example, server 110 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, cryptographic software 206, cryptographic data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 can comprise a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as authentication data 207 and/or program modules such as operating system 205 and authentication software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and cryptographic software 206. Each of the operating system 205 and cryptographic software 206 (or some combination thereof) can comprise elements of the programming and the cryptographic software 206. Cryptographic data 207 can also be stored on the mass storage device 204. Cryptographic data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, the cryptographic data 207 can be stored on a secure chip to ensure that the cryptographic data 207 is not externally readable.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computing device 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via input/output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, smart phone, a server, a router, a network computer, a peer device or other common network node, and so on. Logical connections between the computing device 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of cryptographic software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

As described in greater detail below, authentication of data assigned to a particular recipient device (e.g., decoder 120) can be implemented by the system and methods described herein. However, authentication and/or security of other rights and data can be implemented by the systems and methods.

Figure 3:
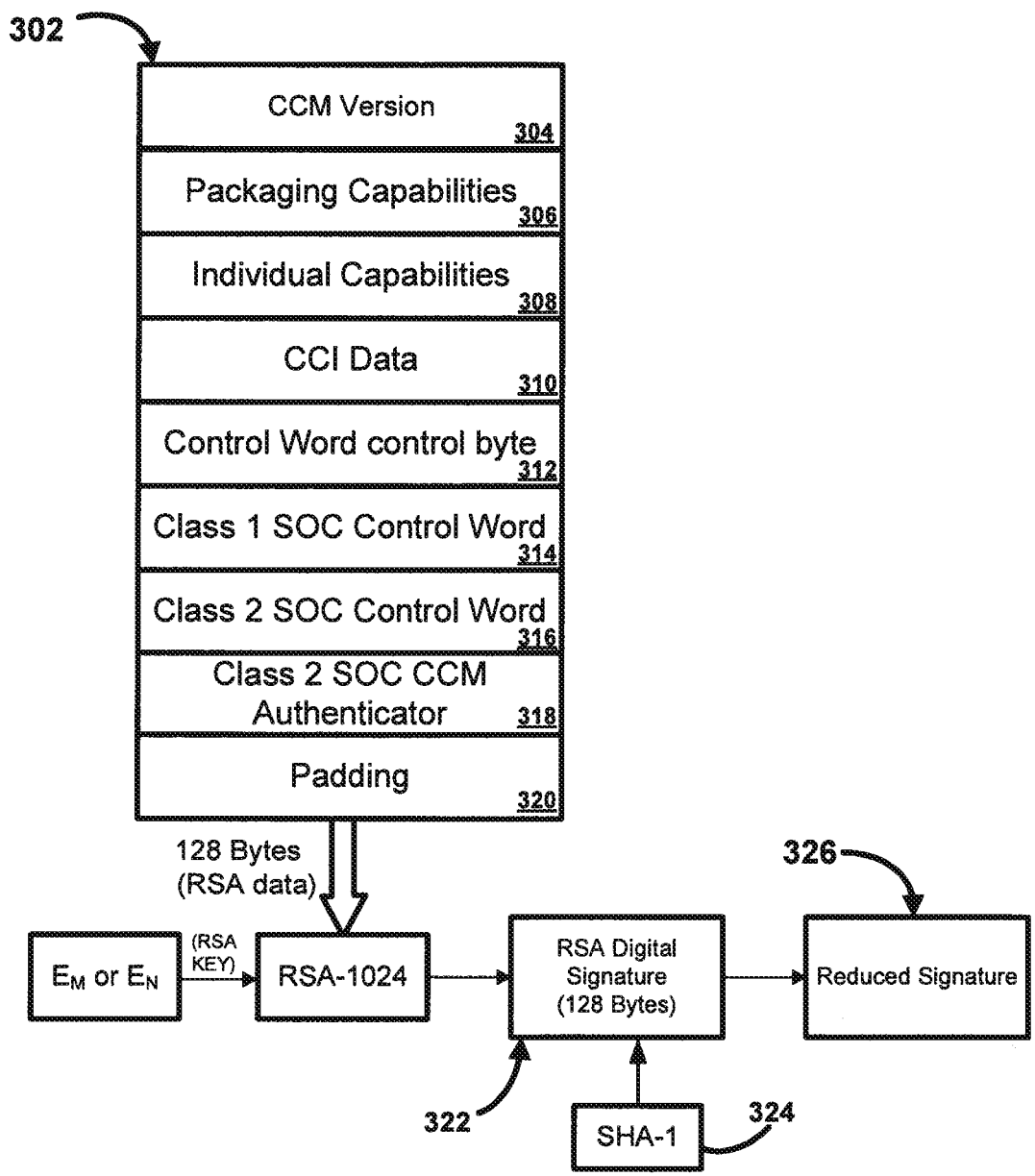
FIG. 3 is a block diagram of an exemplary data and data flow.

FIG. 3 illustrates an exemplary data flow. In an aspect, a data block 302 can comprise Conditional Access information for controlling rights associated with a particular decoder 120. As an example, a data block 302 can comprise a message version 304, packaging capabilities 306, individual capabilities 308, content control information 310, control word byte 312, a first control word 314, a second control word 316, a Class 2 SOC authenticator 318, and padding 320. As an example, at least a portion of the data block 302 can be transmitted as a content control message (CCM). Other transport methods and messages can be used to deliver the data block 302 such as a security messaging protocol (SMP) message, a common key message (CKM), and the like. As a further example, the data block 302, in whole or in part, can be transmitted to the decoder 120 to deliver an authenticated set of rights to the decoder 120 for accessing certain services or content.

In an aspect, the message version 304 can be an identifier associated with a particular transport method, messaging protocol, and/or version of the particular message. As an example, the message version 304 can identify the version of the message syntax. As a further example, a recipient device can be configured to process/discard messages based upon the message version 304.

In an aspect, the packaging capabilities 306 can comprise information relating to a right or rights representing access to a set of services, content items, and/or programs. As an example, the set of services can comprise a group of programs, each program represented by a particular content channel. As a further example, the packaging capabilities 306 can be configured based upon a set of programs or channels available to the recipient device.

As an example, the packaging capabilities 306 can be expressed as a character string. As an example, the packaging capabilities 306 can comprise a bit vector. As a further example, the packaging capabilities 306 can comprise a bit vector having a length of thirty-two bytes. However, other bit expressions having other lengths can be used to represent the packaging capabilities 306.

In an aspect, the individual capabilities 308 can comprise information relating to a right other than a package right. As an example, the individual capabilities 308 can represent information related to conditional access to an individual service, content item, and/or program. As an example, the individual services can comprise a particular programming associated with a particular content channel. As a further example, the individual capabilities 308 can be configured based upon a special programs or channel available to the recipient device such as a pay-per-view channel. In an aspect, the individual capabilities 308 can comprise a bit vector. As an example, the individual capabilities 308 can comprise a bit vector having a length of three hundred twenty bytes. However, other bit expressions having other lengths can be used to represent the individual capabilities 308.

In an aspect, a mobile device, smart phone, or tablet device can be configured to authenticate data in a content delivery environment. As an example, the data can be email, text messages, internet traffic, software application, or any other data that requires authentication between sender and receiver.

In an aspect, the copy control information (CCI) 310 can comprise data regulating the processing of digital content output by the recipient device (e.g., decoder 120, DTA, (U)DTA, etc.). As an example, the CCI 310 can comprise a 16 bit field including a CCI byte and a CCI Extension. As a further example, the CCI Byte can identify a CCI value which specifies the copy protection for recipient device outputs. The format of the CCI_byte may contain CCI-A, a subset of CCI 310 comprising an analog protection system(APS) and/or constrained image trigger (CIT) bits, and CCI-D which is the subset of CCI 310 comprising redistribution constraint trigger (RCT) and/or digital copy control (EMI) bits.

In an aspect, the APS bit(s) can indicate states such as: copy protection encoding off, automatic gain control (AGC) process on, split burst off, AGC process on, two line split burst on, four line split burst on. In an aspect, the CIT bit(s) can indicate no image constraint asserted or image constraint required. In an aspect the RCT bit(s) can indicate whether redistribution control is asserted or required. The EMI bit(s) can indicate states such as: copying not restricted, no further copying is permitted, one generation copy is permitted, or copying is prohibited. As a further example, the CCI Extension can identify extended CCI values. However, other bit expressions and definitions having other lengths can be used to represent the copy control information.

In an aspect, the control word byte 312 can comprise a character or characters (e.g., sequence number) used by a processor (e.g., the decoder 120, the SOC 122, the software module 124, etc.) to identify a control word and values associated with the control word. In an aspect, the control word byte 312 can comprise an rsa_public_key_selector to identify which public key can be used for encryption (e.g., DM or DN). As an example, the shared key identifier 312 can be used relied upon by a processor to apply the appropriate control word to a particular data for processing such as encryption, decryption, authentication, and the like. In an aspect, the control word byte 312 can comprise a control word parity field to identify the parity of the cryptoperiod to which the control word (e.g., first control word 314, second control word 316) delivered in the message applies.

In an aspect, the control word byte 312 can comprise a Class 1 identifier to indicate whether encrypted control words in the CCM are encrypted using Class 1 encryption. As an example, a recipient device using a Class 1 SOC accesses the service by supplying the SOC with the control word protected using Class 1 encryption, if present, and ignores a control word protected using Class 2 encryption, if present.

In an aspect, the control word byte 312 can comprise a Class 2 identifier to indicate whether encrypted control words in the CCM are encrypted using Class 2 encryption. As an example, a recipient device using a Class 2 SOC accesses the service by supplying the SOC with the control word protected using Class 2 encryption, if present, and ignores a control word protected using Class 1 encryption, if present.

In an aspect, the control word byte 312 can comprise a shared key selector to identify the shared key to be used to decrypt the associated encrypted control word (e.g., first control word 314, second control word 316).

In an aspect, the first control word 314 can comprise a secret key. In an aspect, the first control word 314 can be associated with a particular SOC 122, a type/class (e.g., Class 1) of SOC 122, a particular process, or the like. As an example, the first control word 314 can be used to encrypted/decrypt the payloads of MPEG transport packets. However, the first control word 314 can be used to encrypted/decrypt other data and signals. As a further example, the first control word 314 can be encrypted using a shared key or other technique for security and/or authentication.

In an aspect, the second control word 316 can comprise a secret key. In an aspect, the second control word 316 can be associated with a particular SOC 122, a type/class (e.g., Class 2) of SOC 122, a particular process, or the like. As an example, the second control word 316 can be used to encrypted/decrypt the payloads of MPEG transport packets. However, the second control word 316 can be used to encrypted/decrypt other data and signals. As a further example, the second control word 316 can be encrypted using a shared key or other technique for security and/or authentication.

In an aspect, the Class 2 SOC authenticator 318 can comprise information for authenticating the second control word 316. As an example, the class 2 SOC authenticator can be generated by gathering inputs such as the second control word, ccm_package_rights_descriptor, ccm_base_rights_descriptor, and/or cci_data, which are then input to a SCM.

In an aspect, the padding 320 can be a pre-defined number of bits appended to a hash, bit string, or the like. As an example, a block cipher works on units of a fixed size (known as a block size); however messages have a variety of lengths. Accordingly, padding 320 can be applied to provide a block having a pre-determined length. Any padding and length can be used.

In an aspect, the data block 302 can be processed to generate an encrypted element 322. As an example, the encrypted element 322 can be a data encrypted by an RSA key (e.g., EM or EN). As a further example, the encrypted element 322 can have a pre-determined length such as 128 bytes. In an aspect, the encrypted element 322 (e.g., authenticator) can be a digital signature that can be applied to a transmitted data for authentication of the data at a receiving end. As an example, the encrypted element 322 can be a data quantity, which can be a function of a data object and a secret key that allows a processing entity to verify that only a possessor of the secret key could have generated the digital signature. As a further example, the digital signature can be generated over Conditional Access data or rights data to allow the SOC 122 to verify that the Conditional Access information was generated by an approved source. In an aspect, the digital signature can be generated over certain data items delivered in one or more filtered messages and can be used to verify that the data items were provided by the cable system headend and are valid for the timeframe in which they are used. As an example, the encrypted element 322 can be generated using an RSA key such as a level 2 authentication key. Accordingly, the encrypted element 322 can be processed based upon the key (e.g., level 2 authentication key) used to generate the encrypted element 322 in order to authenticate the underlying data.

In an aspect a hash algorithm 324 (e.g., SHA-1) can be applied to the encrypted element 322 to generate at least a portion of a reduced signature 326. As an example, the reduced signature 326 can be a bit string representing a processed data. As an example, the reduced signature 326 can have a fixed length. As a further example, the reduced signature 326 can be a digital fingerprint, checksum, digest, or the like.

In an aspect, the reduced signature 326 can be transmitted to a recipient device to authenticate the data (e.g., data block 302) received thereby. For example, the reduced signature 326 can be compared to an authentication element generated based upon the received data block 302 to authenticate the received rights information. The reduced signature 326 and an underlying data to be authenticated can be transmitted together or in separate messages.

As described in greater detail below, authentication of the data assigned to a particular recipient device (e.g., decoder 120) can be implemented by transmitting a reduced digital signature to the particular recipient device (e.g., decoder 120) along with the underlying rights data. However, authentication and/or security of other rights and data can be implemented by the systems and methods.

Figure 4:
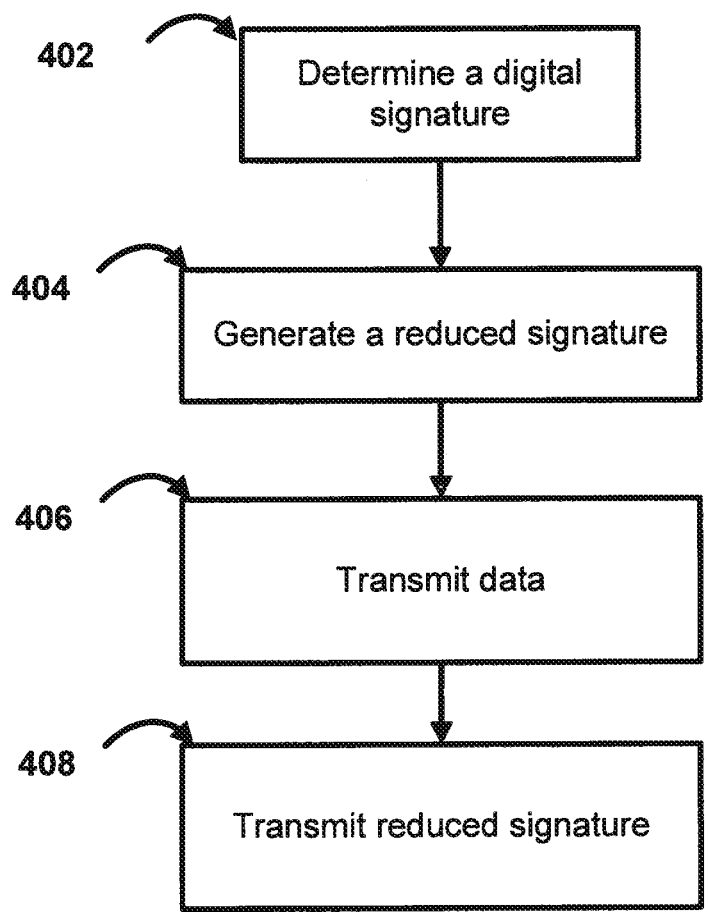
FIG. 4 is a flow chart of an exemplary method of authenticating data.

FIG. 4 illustrates a method for authenticating data. In step 402, data (e.g., data block 302) can be processed to determine a digital signature (e.g., encrypted element 322). In an aspect, the digital signature can be generated by applying a private RSA authentication key (e.g., EM or EN) to the data.

In step 404, the digital signature (e.g., encrypted element 322) can be processed to generate at least a portion of the reduced signature 326. As an example, a hash algorithm can be applied to the digital signature to generate the reduced signature 326, thereby minimizing the bandwidth required to transmit the element used for authenticating the underlying data.

In step 406, the data (e.g., data block 302) used to generate the digital signature can be transmitted to a recipient device for processing. In an aspect, the data can be transmitted as a message block without padding (e.g., padding 320) used for generation of the digital signature. By removing the padding from the data before transmitting, the message size can be minimized, and the bandwidth required to transmit the data is minimized. As an example, the data can comprise control information for defining the functionality of the recipient device. However, other data and information can be transmitted.

In step 408, the reduced signature 326 can be transmitted to a recipient device to authenticate the data (e.g., data block 302) received thereby. For example, the reduced signature 326 can be compared to an authentication element generated based upon the received data (e.g., data block 302) to authenticate the received rights information. The reduced signature 326 and underlying data to be authenticated can be transmitted together or in separate messages. As an example, the reduced signature 326 can be attached to at least a portion of the data block 302 (e.g., with or without padding) and transmitted as a message block.

As described in greater detail below, authentication of the right identifiers assigned to a particular recipient device (e.g., decoder 120) can be implemented by the system and methods described herein. However, authentication of other rights and data can be implemented by the systems and methods.

Figure 5:
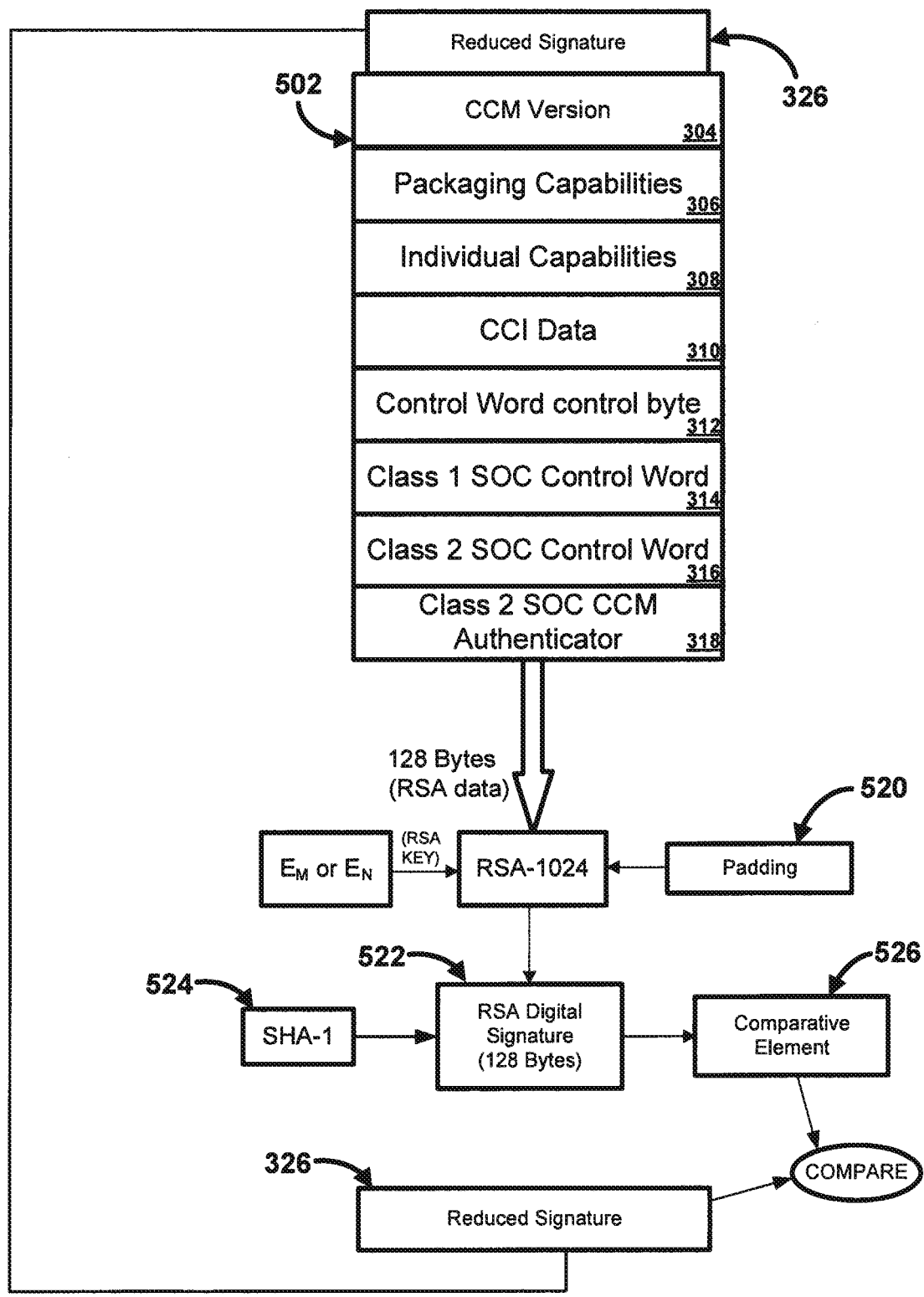
FIG. 5 is a block diagram of an exemplary data and data flow.

FIG. 5 illustrates exemplary data flow. In an aspect, a message block 502 can comprise Conditional Access information for controlling rights associated with a particular decoder 120. As an example, message block 502 can comprise at least a portion of the data from data block 302 such as message version 304, packaging capabilities 306, individual capabilities 308, content control information 310, control word byte 312, a first control word 314, a second control word 316, a Class 2 SOC authenticator 318. Other information can be included such as the reduced signature 326. However, the reduced signature 326 can be transmitted separately from the message block 502. As an example, at least a portion of the data block 502 can be transmitted as a message without padding. Other transport methods and messages can be used to deliver the data block 502 such as a security messaging protocol (SMP) message, a common key message (CKM), and the like. As a further example, the message block 502, in whole or in part, can be transmitted to the decoder 120 to deliver an authenticated set of rights to the decoder 120 for accessing certain services or content.

In an aspect, the message block 502 can be processed to generate an encrypted element 522. As an example, the encrypted element 522 can be data encrypted by an RSA key (e.g., EM or EN). In an aspect, padding 520 can be added to the message block 502 prior to processing in order to facilitate a proper encryption under the key. As a further example, the encrypted element 522 can have a pre-determined length such as 128 bytes. In an aspect, the encrypted element 522 (e.g., authenticator) can be a digital signature that can be applied to transmitted data for authentication of the data at a receiving end. As an example, the encrypted element 522 can be a data quantity, which can be a function of a data object and a secret key that allows a processing entity to verify that only a possessor of the secret key could have generated the digital signature. As an example, the encrypted element 522 can be generated using an RSA key such as a level 2 authentication key. Accordingly, the encrypted element 522 can be processed based upon the key (e.g., level 2 authentication key) used to generate the encrypted element 522 in order to authenticate the underlying data.

In an aspect, a hash algorithm 524 (e.g., SHA-1) can be applied to the encrypted element 522 to generate at least a portion of a comparative element 526 or reduced signature. As an example, the comparative element 526 can be a bit string representing processed data. As an example, the comparative element 526 can have a fixed length. As a further example, the comparative element 526 can be a digital fingerprint, checksum, digest, and the like.

In an aspect, the comparative element 526 can be compared to the reduced signature 326 generated based upon the received data block 302 to authenticate the received rights information. The reduced signature 326 and underlying data to be authenticated can be received together or in separate messages. In an aspect, the reduced signature 326 can be an attachment to the message block 502 and can be retrieved for comparison to the comparative element 526. Other techniques and methods for transmitting and receiving the reduced signature 326 and the underlying data for authentication can be used.

As described in greater detail below, authentication of the right identifiers assigned to a particular recipient device (e.g., decoder 120) can be implemented by comparing message digests, digital signatures, hash values, and/or other representative data structures. However, authentication of other rights and data can be implemented by the systems and methods.

Figure 6:
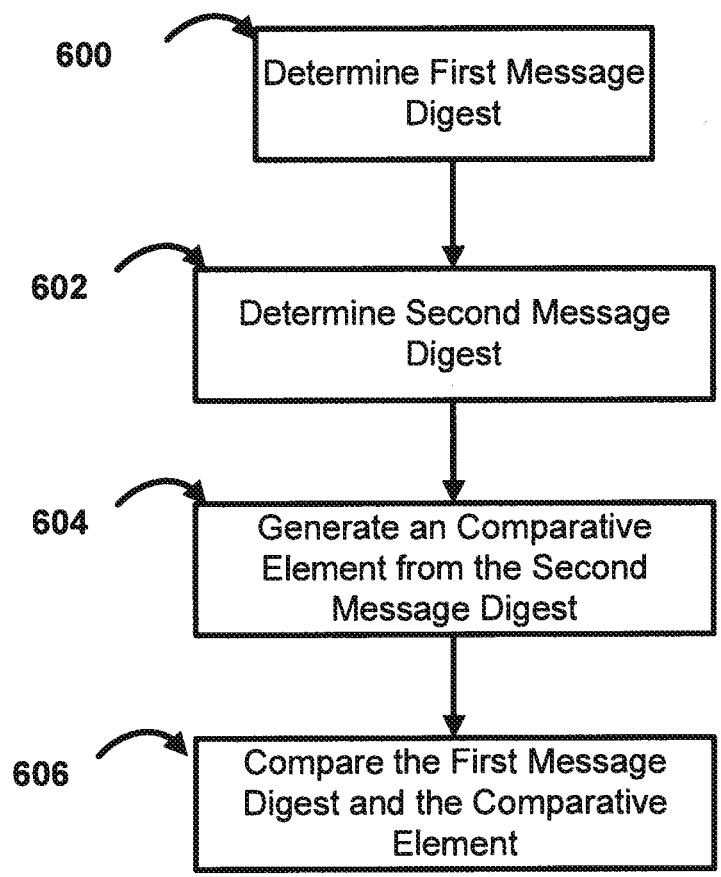
FIG. 6 is a flow chart of an exemplary method of generating authentication data.

FIG. 6 illustrates a method for authenticating data. In step 600, a first message digest can be determined. In an aspect, the message block 502 can comprise the first message digest (e.g., reduced signature 326). As an example, the first message digest can be extracted from the message block 502 prior to processing the remainder of the message block 502. As a further example, the first message digest can be received in a separate message from the message block 502. Other means of generating and/or receiving the first message digest can be used such as retrieving the first message digest from a memory or storage media.

In step 602, data (e.g., at least a portion of message block 502) can be processed to determine a second message digest (e.g., encrypted element 522). In an aspect, the second message digest can be generated by applying a private authentication key (e.g., RSA key) to the data. As an example, the data can be provided/extracted from one or more messages received by a recipient device such as the decoder 120, for example. As a further example, a padding can be added to the data in order to provide a proper data length for processing. Any compatible padding or similar techniques can be used.

In step 604, an authentication element (e.g., comparative element 526) can be generated from the second message digest. In an aspect a hash algorithm (e.g., SHA-1) can be applied to the second message digest to generate at least a portion of an authentication element or reduced signature. As an example, the authentication element can be a bit string representing processed data. As an example, the authentication element can have a fixed length. As a further example, the authentication element can be a digital fingerprint, checksum, digest, and the like.

In step 606, the first message digest and the authentication element can be compared, wherein a match indicates that the underlying data (e.g., at least a portion of the message block 502) is from an authenticated source. In an aspect, the authenticated items of the message block 502 and/or the digital signature or authenticator can be stored in non-volatile memory. As an example, the authenticated items of the message block 502 and/or the first message digest can be stored in a tamper resistant memory. In an aspect, the first message digest and the authenticated data can be stored in memory associated with the decoder 120 and/or SOC 122, wherein the decoder 120 and/or SOC 122 can verify the authenticated data upon a startup procedure.

In an aspect, once a data is authenticated, the recipient device can process the authenticated data to allow consumption and or processing of the underlying authenticated data. As an example, the authenticated data can comprise an encrypted control word that can be processed (e.g., unencrypted) by using separately authenticated data. As a further example, the authenticated data can also contain rights controlling access to particular content which can be matched with separately authenticated access rights where the matching of the rights controls the loading of the previously processed control word, effectively allowing or preventing completion of the key ladder to decrypt protected content (e.g. video).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for securing data comprising:
processing, by at least one processor, a data block to generate a signature;
processing the signature to generate a reduced signature;
transmitting the data block to a recipient; and
transmitting the reduced signature to the recipient.

2. The method of claim 1, wherein the data block comprises a control word identifier for indicating whether an encrypted control word is stored in the data block.

3. The method of claim 1, wherein the data block comprises a first encrypted control word.

4. The method of claim 3, wherein the first encrypted control word is associated with a first class of recipient devices.

5. The method of claim 3, wherein the data block comprises a second encrypted control word.

6. The method of claim 5 wherein the second encrypted control word is associated with a second class of recipient devices, different from the first class of recipient devices.

7. The method of claim 1, wherein the signature comprises a padding.

8. The method of claim 1, wherein processing the data block comprises encrypting the data block using an authentication key.

9. The method of claim 1, further comprising transmitting the authentication key to the recipient.

10. The method of claim 1, wherein processing the signature comprises hashing the signature using a hash algorithm.

11. The method of claim 1, wherein the data block comprises one or more of packaging capability information, individual capability information, and copy control information.

12. A method for securing data comprising:
receiving a data block;
receiving a reduced signature;
processing, by at least one processor, the data block to generate a signature;
processing the signature to generate a comparative element; and
comparing the reduced signature to the comparative element to authenticate the data block.

13. The method of claim 12, wherein the data block comprises a control word identifier for indicating whether an encrypted control word is stored in the data block.

14. The method of claim 12, wherein the data block comprises a first encrypted control word.

15. The method of claim 14, wherein the first encrypted control word is associated with a first class of recipient devices.

16. The method of claim 14, wherein the data block comprises a second encrypted control word.

17. The method of claim 16, wherein the second encrypted control word is associated with a second class of recipient devices, different from the first class of recipient devices.

18. The method of claim 12, further comprising adding a padding to the data block prior to processing the data block to generate a signature.

19. The method of claim 12, wherein processing the data block comprises encrypting the data block using an authentication key.

20. The method of claim 12, wherein processing the signature comprises hashing the signature using a hash algorithm, wherein the comparative element is a hash of the signature.

21. A system comprising:
   a memory for storing a data block and a reduced signature; and
   at least one processor in communication with the memory, the at least one processor configured to,
   process the data block to generate a signature,
   process the signature to generate a comparative element, and
   compare the reduced signature to the comparative element to authenticate the data block.

22. The system of claim 21, wherein the data block comprises a control word identifier for indicating whether an encrypted control word is stored in the data block.

23. The system of claim 21, wherein the data block comprises a first encrypted control word.

24. The system of claim 21, wherein the first encrypted control word is associated with a first class of recipient devices.

25. The system of claim 23, wherein the data block comprises a second encrypted control word.

26. The system of claim 25, wherein the second encrypted control word is associated with a second class of recipient devices, different from the first class of recipient devices.

27. The system of claim 21, wherein processing the data block comprises encrypting the data block using an authentication key.

28. The system of claim 21, wherein processing the signature comprises hashing the signature using a hash algorithm.

29. The system of claim 21, wherein the data block comprises one or more of packaging capabilities, individual capabilities, and copy control information.

* * * * *

UNITED STATES PATENT AND TRADEMARK OFFICE
CERTIFICATE OF CORRECTION

| | |
|---|---|
| PATENT NO. | : 8,645,691 B2 |
| APPLICATION NO. | : 13/350415 |
| DATED | : February 4, 2014 |
| INVENTOR(S) | : Jon L. Pang |

It is certified that error appears in the above-identified patent and that said Letters Patent is hereby corrected as shown below:

IN THE DRAWINGS

Sheet 6, Fig. 6, in reference numeral 604, replace "Generate an Comparative" with -- Generate a Comparative --

IN THE SPECIFICATION

In column 1, lines 63-64, replace "processor configured to, process" with -- processor configured to process --

In column 2, line 63, replace "disclosed that" with -- disclosed, that --

In column 5, lines 10, replace "or proximate, user" with -- or proximate to, user --

In column 7, line 11, replace "can represents" with -- can represent --

In column 9, line 4, replace "the like These" with -- the like. These --

In column 10, line 63, replace "a special programs" with -- a special program --

In column 11, lines 11-12, replace "comprise a 16 bit" with -- comprise a 16-bit --

In column 11, line 15, replace "CCI_byte" with -- CCI byte --

In column 11, line 23, replace "on, four line" with -- on, and four line --

In column 11, lines 40-41, replace "can be used relied upon" with -- can be relied upon --

Signed and Sealed this
Seventh Day of July, 2015

Michelle K. Lee
*Director of the United States Patent and Trademark Office*

CERTIFICATE OF CORRECTION (continued)
U.S. Pat. No. 8,645,691 B2

In column 12, lines 3-4, replace "encrypted/decrypt" with -- encrypt/decrypt --

In column 12, line 5, replace "encrypted/decrypt" with -- encrypt/decrypt --

In column 12, line 14, replace "encrypted/decrypt" with -- encrypt/decrypt --

In column 12, line 16, replace "encrypted/decrypt" with -- encrypt/decrypt --

In column 12, line 36, replace "can be a data" with -- can be data --